United States Patent [19]
Guilbault et al.

[11] 3,943,996
[45] Mar. 16, 1976

[54] LOW FLUID LOSS CEMENTING COMPOSITIONS

[75] Inventors: Lawrence James Guilbault, McMurray; Frederick Alan Hoffstadt, Coraopolis, both of Pa.

[73] Assignee: Calgon Corporation, Pittsburgh, Pa.

[22] Filed: June 27, 1975

[21] Appl. No.: 590,974

Related U.S. Application Data

[62] Division of Ser. No. 519,155, Oct. 30, 1974.

[52] U.S. Cl. .............. 166/293; 166/295; 260/42.13
[51] Int. Cl.² ..................... C08K 3/22; E21B 33/14
[58] Field of Search.................. 166/293, 294, 295; 260/42.13, 29.6 S, 29.6 H, 89.5 N, 86.1 N

[56] References Cited
UNITED STATES PATENTS

| | | | |
|---|---|---|---|
| 3,094,501 | 6/1963 | Wahl et al. | 260/42.13 |
| 3,132,693 | 5/1964 | Weisand | 166/293 |
| 3,140,269 | 7/1964 | Wahl et al. | 166/293 X |
| 3,284,393 | 11/1966 | Vanderhoff et al. | 260/29.6 H |
| 3,409,080 | 11/1968 | Harrison | 166/293 |
| 3,511,314 | 5/1970 | Scott, Jr. et al. | 166/293 |
| 3,591,542 | 7/1971 | Bonnel et al. | 166/293 X |
| 3,661,880 | 5/1972 | Markert et al. | 260/89.5 N |
| 3,826,311 | 7/1974 | Szabo et al. | 166/294 X |
| 3,877,522 | 4/1975 | Knight et al. | 166/294 X |

*Primary Examiner*—Stephen J. Novosad
*Attorney, Agent, or Firm*—Rudolph J. Anderson, Jr.; Harry E. Westlake; Martin L. Katz

[57] ABSTRACT

Improved cementing compositions and their use in well cementing operations is disclosed, wherein methacrylamidopropyltrimethylammonium chloride polymers are used as fluid loss additives for aqueous hydraulic cement slurries.

2 Claims, No Drawings

LOW FLUID LOSS CEMENTING COMPOSITIONS

This is a division of application Ser. No. 519,155, filed Oct. 30, 1974.

BACKGROUND OF THE INVENTION

The present invention relates to improved cementing compositions and their use in cementing operations, particularly for cementing wells penetrating subterranean formations.

In particular, the present invention relates to additives to cementing compositions employed in the cementing of oil and gas wells, for the purpose of reducing fluid loss from the cementing composition to the surrounding subterranean formation which the well has penetrated.

More particularly, the present invention relates to methacrylamidopropyltrimethylammonium chloride polymers as fluid loss additives to aqueous hydraulic cement slurries and the use of such slurries in well cementing operations.

Polymer compositions have long been used as additives to cementing compositions for the purpose of reducing water loss. For example, U.S. Pat. No. 2,614,998 discloses the use of water-soluble alkali salts of partially hydrolyzed polyacrylamide and polyacrylic acid for reducing the filtration of water from cement slurries. U.S. Pat. No. 3,359,225 describes the use of polyvinylpyrrolidone to prevent the separation of free water from a cement slurry to which it is added and U.S. Pat. No. 3,511,313 discloses a method for sealing void spaces in a geological formation with a liquid slurry of water swellable poly-N-vinyl pyrrolidone in an organo solvent therefor.

SUMMARY OF THE INVENTION

In drilling and completion of wells, particularly gas and oil wells, a bore-hole is drilled through the overlying layers of the earth's crust to a geologic formation from which it is desired to recover a fluid mineral contained therein. A casing is then introduced into the wellbore and cemented in place. This secures the casing in position, preventing unwanted shifting of the casing when the fluid being produced from a formation moves through it under considerable pressure. The cement also serves the important function of sealing off porous formations adjacent to or penetrated by the wellbore. Typically, a cement slurry is pumped downwardly through tubing within the well casing and flows out of the open lower end of the casing at the well bottom. It is then forced upwardly around the casing in the annular space between the outer wall of the casing and the wall of the wellbore. Thus pumped into place, the cement slurry sets into a monolithic mass in situ. After setting, the cement prevents the flow of undesired fluids from one formation to another, especially into the formation producing gas or oil.

However, neat cement slurries, that is, those comprising hydraulic cement and water, are subject to high fluid loss in porous formations. The water of the slurry migrates into the formation and the cement solids of the slurry are filtered out onto the face of the formation. This loss of water from cement slurries is accelerated by the relatively high pressures required to inject cement slurries into the annular space between well casing and wellbore. This pressure often results in squeezing water from the slurry and forcing this water into the pores of the surrounding formation. This loss of water from cement slurries is also increased by the practice of mechanically scraping away the drilling mud from the wall of the wellbore prior to pumping of the cement slurry into position. This procedure exposes porous formations which absorb water from the slurry.

Numerous problems are created by the loss of any appreciable amount of water from a cement slurry during a well cementing operation. For example, the lost water may contaminate the producing formation. Where oil sands are encountered, the contaminating water may cause shaley impurities in the sand to swell, thus greatly reducing the permeability of the oil sand formation. The loss of water will result in reduced fluidity of the cement slurry. This, in turn, requires increased pumping pressures and jeopardizes the entire cementing operation. Proper emplacement of the cement slurry is rendered difficult, accurate prediction of pumping times and cement volumes is prevented, cementing operation costs are increased, and final results are unsatisfactory. The loss of water from the cement slurry results in thickening or premature setting of the cement, often making completion of the cementing operation either difficult or impossible. The loss of water tends to result in a set cement of non-uniform consistency and of reduced compressive strength. As is known in the cementing art, greater compressive strengths are obtained when reduced quantities of water are employed to make up the cement slurry. Thus, reduction of the loss of water from a cement slurry to surrounding formations will also result in a reduction of the initial amount of water required to make up the slurry. This will allow complete hydration of the cement with reduced amounts of water, resulting in set cements of greater compressive strength.

The present invention, therefore, is concerned with improved hydraulic cement slurry compositions and their use in cementing operations wherein the slurry composition is characterized by low water loss to surrounding porous formations during pumping of the cement slurry into place and the subsequent setting of the cement.

As used herein, the term "fluid loss" is intended to refer primarily to water loss, but is also intended to include minor amounts of other fluids which are subject to loss.

In accordance with the present invention, minor amounts of a polymer of methacrylamidopropyltrimethylammonium chloride are added to an aqueous hydraulic cement slurry to reduce the rate of fluid loss from the slurry to any fluid-absorbing medium with which the slurry may come into contact.

The polymers of our invention are high molecular weight, water-soluble polymers of methacrylamidopropyltrimethylammonium chloride and may be prepared in any convenient manner, as for example, in the manner taught by U.S. Pat. No. 3,661,880 or by conventional solution or inverted emulsion polymerization techniques, as for example the procedures disclosed in U.S. Pat. No. 3,284,393.

The polymers useful in this invention should have high molecular weights, preferably of at least 100,000 and more preferably of at least 1,000,000 and should have a solubility in water of at least 0.25 percent. These polymers may be copolymers of methacrylamidopropyltrimethylammonium chloride and acrylamide containing from 10 to 90 percent by weight acrylamide. While the chloride anion is the most preferred quaternary ammonium derivative, other anions such as fluoride, bromide, nitrate, acetate, hydrogen sulfate, and dihydrogen phosphate may be utilized with the cationic polymers of this invention.

The compositions and methods of the present invention may employ any type of hydraulic cement. Hydraulic cement is defined as any cement which will set or cure under the action of water, and is intended to include all mixtures of lime, silica and alumina, or of lime and magnesia, silica, and alumina and iron oxide. Hydraulic cements include hydraulic limes, grappier cements, pozzolan cements, natural cements, and portland cements. Pozzolan cements include slag cements made from slaked lime and granulated blast furnace slag. Among these hydraulic cements, the portland cements are preferred, chiefly because of their superior strength characteristics. The term portland cement is intended to include any cement regarded in the cementing art as a portland cement, usually as defined by standard reference works. The precise composition of any one particular portland cement will vary from another, but generally portland cements are produced by mixing and grinding together a calcareous and an argillaceous material, kiln heating the mixture (1350° to 18000° C.) until vitrification begins, pulverizing the clinker thus produced and mixing the same with a small amount of gypsum. The portland cements may be ground to any desired particle size, and grading of portland cements is on the basis of the specific surface of the cement, which will range between 1200 and 2600 square centimeters per gram. Grading is also based on the amount of cement particles retained on a No. 325 screen, U.S. Sieve Series. Thus, preferred oil well cements have a specific surface of about 1480 square centimeters per gram and about 85 percent by weight passes through a No. 325 screen.

The hydraulic cement may be employed alone in preparing the cementing composition of the present invention, merely being admixed with water and the low fluid loss additive, or it may have additionally incorporated therein any of a number of conventional cement additives. For example the cement may include a minor portion, up to about 2.0 percent by weight of dry cement, of a retarder composition. Such an additive is preferred for oil well cements, since cementing operations are conducted under ambient well bottom temperatures which can exceed about 200° F. Examples of conventional retarder compositions include carboxymethylhydroxyethyl cellulose, borax, dehydrated borax, calcium lignosulfonate and ferrochrome lignosulfonate.

Weighting components comprising inert materials such as barite and ilmentite are often employed. Silica may be employed to retard high temperature strength retrogression.

Other known additives conventionally employed with cementing compositions may be employed with the cementing compositions of this invention, and in amounts sufficient to produce the intended modification of the cementing composition characteristics for which any additive was selected. More than one such additive may, of course, be employed at the same time.

The dry hydraulic cement component of the cementing composition of the present invention is admixed with water to form a pumpable, settable cement slurry. The cement sets to form a monolithic solid. The water which is employed to form this cement slurry may be any naturally occurring water suitable for preparing cement slurries. Particularly, brines of any concentration of calcium chloride or sodium chloride or their mixtures are suitable. Sea water may be employed and is thus convenient in offshore operations. It is a particular advantage of the low fluid loss polymer additives of the present invention that they are effective in reducing fluid loss from a cement slurry even where brines are employed to make up the slurry. This constitutes an important advantage over many low fluid loss cement additives known in the art.

The amount of water employed to make up the hydraulic cement slurry is not critical, and generally the amount of water necessary to give a settable cement composition having the required characteristics will be in an amount of from about 25 percent to about 60 percent by weight, based on the weight of dry hydraulic cement. As discussed previously, the amount of water employed should be only such as is sufficient to produce a pumpable slurry. Use of the low water loss additives of the present invention makes it unnecessary to add excess water in anticipation of substantial water losses. The reduced initial water content will thereby tend to result in set cements of increased compressive strength.

The polymer fluid loss additives of the present invention are employed in an amount sufficient to produce a measurable reduction in the loss of fluid from a cement slurry to which it has been added. Preferably, the amount employed will effect at least a 25 percent reduction in fluid loss. More preferably, the amount employed will effect a 50 percent reduction in fluid loss; and most preferably the amount employed will be sufficient to effect a fluid loss reduction in excess of 75 percent. While increasingly greater amounts of fluid loss reduction may be produced by employing correspondingly greater amounts of the fluid loss additives of this invention, reductions in excess of about 90 percent are usually not justified economically. Moreover, amounts of fluid loss additive necessary to produce extremely high reductions of fluid loss will also produce attendant difficulties with respect to undersirable effects on the properties of the cement slurry and set cement. As a general rule, a fluid loss of about 100 ml. over 30 minutes (as measured by the method set out in Example 1 below) is considered desirable.

Generally, the amount of polymeric fluid loss additive employed will be in the range of from 0.05 to about 5.0 percent by weight of dry hydraulic cement, and usually in an amount of from about 0.15 to about 2.0 percent by weight of dry hydraulic cement. In determining specific amounts, consideration must be given to such factors as the composition of the cement slurry to which the fluid loss additive is added, and the temperatures to be encountered by the cement slurry during the cementing operation.

The procedure for preparing the cementing compositions of the present invention does not require any particular sequence of steps. The polymer low fluid loss additives of the present invention are water-soluble and thus may be mixed with the hydraulic cement before the addition of water, may be added to the slurry at the time of mixing, or may be added to the water before preparation of the cement slurry. When other conventional additives are employed, they may be incorporated into the final cement slurry composition in any known suitable manner.

The invention will be better understood from the following example which illustrates the preparation and fluid loss reducing activity of representative polymers

EXAMPLE 1

Evaluation of Fluid Loss Reducing Properties

The evaluation procedure employed was that set out in API bulletin RP 10B, Nineteenth Edition, January 1974, Section 8, pages 43 – 44. A cement slurry was made up containing 600 grams of Class H cement (API Class H cement has a fineness in the range of 1400 – 1600 square centimeters per gram and contains, in addition to free lime and alkali, the following compounds in the indicated proportions: Tricalcium silicate — 52; dicalcium silicate — 25; tricalcium aluminate — 5; tetracalcium aluminoferrite — 12; calcium sulfate — 3.3), 210 grams silica flour, and 6 grams fluid loss additive of the present invention (1.0 percent by weight of dry hydraulic cement) in 324 mls. of 18 percent sodium chloride solution. These ingredients were mixed in a Waring Blender for 15 seconds at low speed, and then for 35 seconds at high speed. The resultant slurries were then mixed in a Halliburton consistometer for 20 minutes at 190°F. The slurry samples were placed in a Baroid high pressure filter press cell maintained at 190°F. In the filter press cell the slurry samples were forced against a No. 325 U.S. Standard Sieve Series screen with 1000 psi. pressure supplied by compressed nitrogen. The fluid removed from the slurry was collected and measured. Constant pressure was maintained and the filtrate collected over a 30 minute period. Results were reported as volume of filtrate (in mls.) collected in a 30 minute period. The results obtained are illustrated in the following table:

| Sample | Concentration of Additive (Percent by weight of dry cement) | Fluid Loss (ml/30 min. at 1000 psi.) |
|---|---|---|
| Neat Cement | 0.0 | 1000* |
| MAPTAC/AM 25/75 (high molecular weight) | 1.0 | 60.0 |

*For neat cement (hydraulic cement and water only), virtually all water present was removed in less than one minute, and the value indicated was obtained by extrapolation.
MAPTAC = methacrylamidopropyltrimethylammonium chloride
AM = acrylamide

We claim:

1. A method of cementing a zone in a well penetrating a subterranean formation comprising injecting down the well and positioning in the zone to be cemented an hydraulic cement aqueous slurry composition comprising dry hydraulic cement, from about 0.05 to about 5.0 percent by weight, based on dry hydraulic cement, of a water-soluble polymer of methacrylamidopropyltrimethylammonium chloride, and sufficient water to form a pumpable slurry; and allowing the cement thus positioned to set to a monolithic mass; whereby loss of fluid from the cement slurry to the formation is reduced.

2. A method as in claim 1 wherein the polymer is a copolymer of acrylamide and methacrylamidopropyltrimethylammonium chloride.

* * * * *

UNITED STATES PATENT OFFICE
CERTIFICATE OF CORRECTION

PATENT NO. : 3,943,996
DATED : March 16, 1976
INVENTOR(S) : Lawrence James Guilbault and Frederick Alan Hoffstadt It is certified that error appears in the above-identified patent and that said Letters Patent are hereby corrected as shown below:

Column 3, Line 24 "(1350° to 18000° C.)" should read
-- (1350° to 1800° C.) --.

Signed and Sealed this

*twenty-second* Day of *June 1976*

[SEAL]

Attest:

RUTH C. MASON
*Attesting Officer*

C. MARSHALL DANN
*Commissioner of Patents and Trademarks*